(12) United States Patent
Kelley et al.

(10) Patent No.: US 7,184,756 B2
(45) Date of Patent: Feb. 27, 2007

(54) WIRELESS COMMUNICATION DEVICE WITH TAMPER RESISTANT CONFIGURATION SETTINGS

(75) Inventors: Ronald J. Kelley, Plantation, FL (US); Steven D. Pratt, Ft. Lauderdale, FL (US); Sivakumar Muthuswamy, Plantation, FL (US)

(73) Assignee: Motorola Inc., Schaumburg, IL (US)

( * ) Notice: Subject to any disclaimer, the term of this patent is extended or adjusted under 35 U.S.C. 154(b) by 570 days.

(21) Appl. No.: 10/460,136

(22) Filed: Jun. 12, 2003

(65) Prior Publication Data
US 2004/0253944 A1 Dec. 16, 2004

(51) Int. Cl.
*H04M 3/00* (2006.01)
(52) U.S. Cl. ............... 455/418; 455/419; 455/420
(58) Field of Classification Search ......... 455/418, 455/419, 420
See application file for complete search history.

(56) References Cited

U.S. PATENT DOCUMENTS

| | | | | |
|---|---|---|---|---|
| 4,825,200 A | * | 4/1989 | Evans et al. ............ 341/23 |
| 5,802,460 A | * | 9/1998 | Parvulescu et al. ....... 455/92 |
| 6,215,994 B1 | * | 4/2001 | Schmidt et al. .......... 455/419 |
| 6,275,694 B1 | * | 8/2001 | Yoshida et al. .......... 455/419 |
| 6,556,840 B2 | * | 4/2003 | Zicker et al. ............ 455/551 |
| 6,731,930 B2 | * | 5/2004 | Robin et al. ............ 455/419 |

OTHER PUBLICATIONS

RFID Handbook, Radio Frequency Identification Fundamentals and Applications, Klaus Finkenzeller, John Wiley & Sons, pp. 17, 171-174, 177-178, 200-203.
Web Pages: http://www.wildseed.com/software/index/htm.

* cited by examiner

*Primary Examiner*—Bing Q. Bui
(74) *Attorney, Agent, or Firm*—Randi L. Karpinia; Sylvia Chen; Douglas S. Rupert

(57) ABSTRACT

Devices (302, 702, 800) with embedded control programs are provided are provided with RF-ID devices (114, 504) or other non-contact read data carriers (604) that provide configuration data, on which the execution of the embedded control programs is contingent. Preferred embodiments include wireless communication devices (302, 702, 800) provided with RF-ID devices (114, 504) or set of magnets (604) that encodes data embedded in front fascia. Embodiments of the invention increase the security of configuration data, and allow for functionality to enhanced by replacing the front fascia.

22 Claims, 7 Drawing Sheets

WIRELESS COMMUNICATION DEVICE WITH TAMPER RESISTANT CONFIGURATION SETTINGS

BACKGROUND OF THE INVENTION

1. Field of the Invention

The present invention relates in general to embedded software controlled devices. More particularly, the present invention relates to safeguarding the configuration data of programmable radios.

2. Description of Related Art

Currently in the interest of exploiting economies of scale in manufacturing, two way radios that are made for different end use markets and which may use slightly different frequencies, and have different functionality, share a common hardware design, and only differ in so far as configuration settings that are defined in data read by embedded software. In a given locale, one or more user groups (e.g., a police department) may be allocated a portion of spectrum for conducting communication, and be outfitted with two way radios configured to operate securely at frequencies within the allocated spectrum. For many user groups, such as a police department, there is a desire to maintain conversations conducted through two way radios confidential. Unfortunately, the fact that operating frequencies, and other configuration settings, are defined in software, makes it possible for individuals to reprogram such two way radios to change their operating frequency and other configuration settings in order to use those radios to listen to, or send messages using spectrum that the individual is not authorized to use. All that may be required to do so is record information on a Programmable Read Only Memory (PROM) Chip or, on an Electrically Erasable Read Only Memory (EEPROM) Chip. To make large changes in operating frequency some changes to the RF to IF modulator/demodulator hardware may be required.

In a different area of wireless communication, namely cellular telephony, a variety of additional functionality beyond simple voice communication has been introduced. Examples of additional functionality added to cellular communication devices, includes, text messaging, World Wide Web (WWW) surfing, and data exchange. Certain more advanced cellular telephones, are able to communicate using multiple communication protocols. The market for cellular communication devices is stratified according to the level of functionality beyond basic voice telephony and includes devices having a wide range of functionality. It would be desirable to provide a way for users to upgrade the capability of their phones, without having to purchase an entirely new replacement phone.

BRIEF DESCRIPTION OF THE FIGURES

The present invention will be described by way of exemplary embodiments, but not limitations, illustrated in the accompanying drawings in which like reference numerals denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
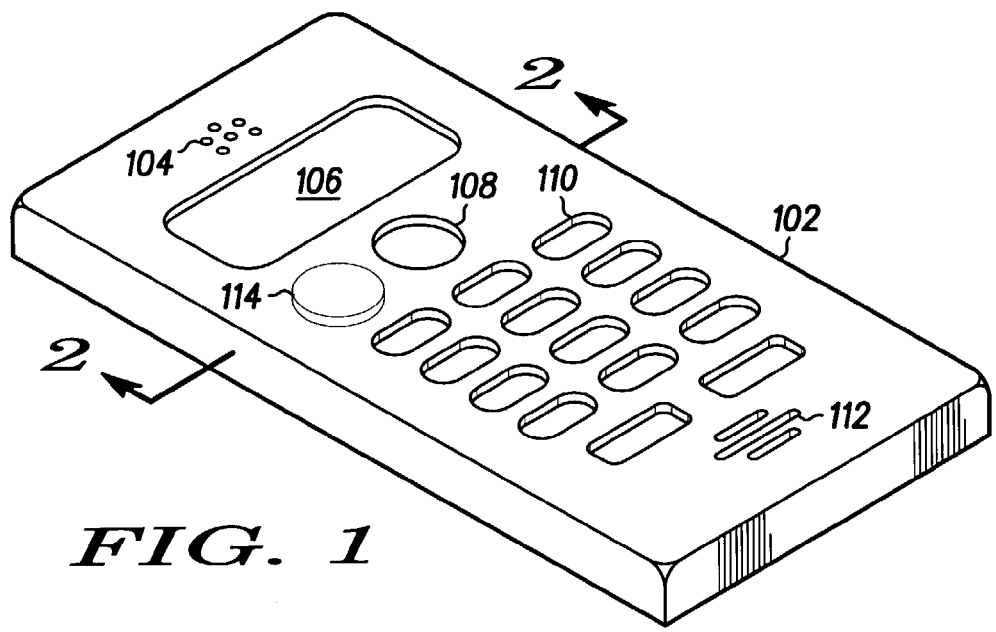
FIG. 1 is a partial x-ray perspective view of a first front fascia of a first wireless communication device.
Figure 2:
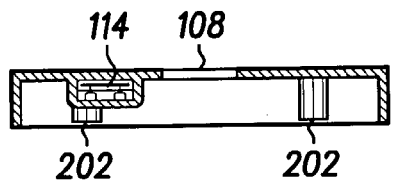
FIG. 2 is a cross sectional view of the first front fascia shown in FIG. 1 including an embedded RF-ID device.

FIG. 1 is a partial x-ray perspective view of a first front fascia 102 of a first wireless communication device 302 (FIG. 3) according to the preferred embodiment of the invention and FIG. 2 is a cross sectional view of the first front fascia 102. The front fascia 102 preferably comprises an injection molded shell and a plurality of openings including a plurality of speak grill openings 104, a display window 106, a menu navigation button opening 108, a plurality of key holes 110, and a set of microphone grill openings 112. Screw hole bosses 202 are used for mounting the first front fascia 102. The first front fascia 102 also includes a first information bearing Radio Frequency Identification (RF-ID) device 114. The first RF-ID device 114 is embedded within the first front fascia 102. The first front fascia 102 with embedded first RF-ID device 114 is preferably manufactured by insert molding. The functioning of the first RF-ID device 114 is described further hereinbelow.

Figure 3:
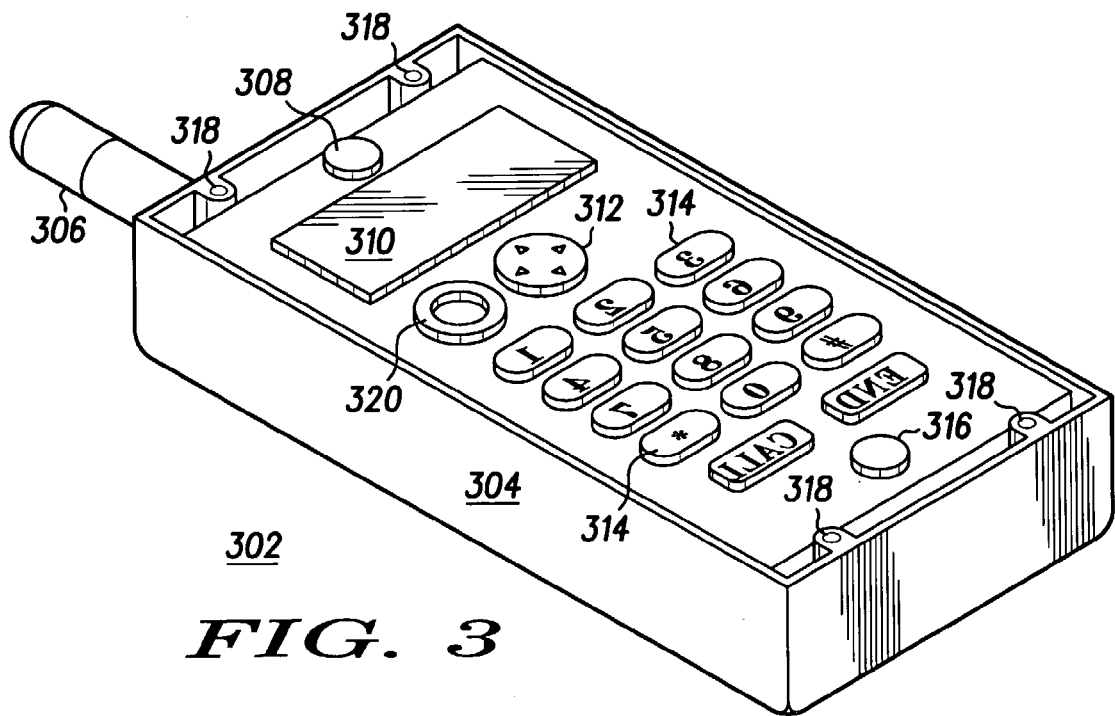
FIG. 3 is a perspective view of the first wireless communication device without the front fascia shown in FIGS. 1, 2.

FIG. 3 is a perspective view of the first wireless communication device 302 without the front fascia 102 shown in FIG. 1. The first wireless communication device 302 is preferably a cellular telephone, and/or a two way radio. The first wireless communication device 302 comprises a plurality of components supported in a rear housing part 304. The front fascia 102 mates with the rear housing part 304. The wireless device 302 includes a main antenna 306, a speaker 308 a display 310, a menu navigation button 312, a plurality of keys 314, and a microphone 316. Additional screw hole bosses 318 that line up with the screw hole bosses 202 in the front fascia 102 are provided inside the rear housing part 304 for accommodating screws used to attach the front fascia 102, to the rear housing part 304. According to an alternative embodiment of the invention the front fascia 102 includes integrally mold mounting tabs, and snap fits to the rear housing part 302. According to an alternative embodiment of the invention the first RF-ID device 114 is included in a cosmetic fascia that fits over a primary front fascia. An air interface in the form of a first inductive coil 320 is also included in the first wireless communication device 302. The first inductive coil 320 serves as an antenna for exchanging data with the first RF-ID device 114. According to an alternative embodiment (not shown) one or more, and preferably a pair, of capacitive electrodes are included in the first wireless communication device 302 instead of the inductive coil 320. As described below in more detail with reference to FIG. 9 the inductive coil 320 is coupled to circuits used to send and receive information. Internal electrical circuitry of the first wireless communication device, according to the preferred embodiment of the invention is described below in more detail with reference to the block diagram shown in FIG. 9.

Figure 4:
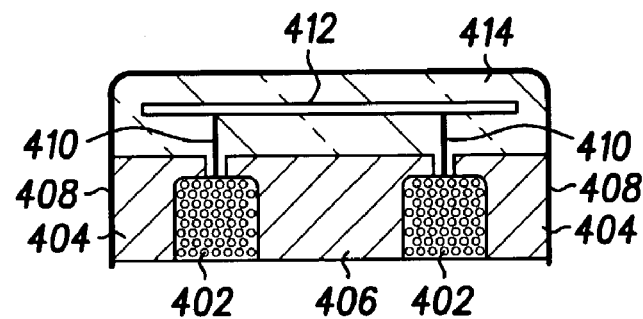
FIG. 4 is a cross sectional view of the RF-ID device.

FIG. 4 is a cross sectional view of the first RF-ID 114 device. The first RF-ID device comprises an air interface in the form of a second inductive coil 402 wound in a magnetic core 404 that includes an annular recess 406 for accommodating the second inductive coil 402. The second inductive coil 402 is used as an antenna for exchanging data with the first wireless communication device 302. The magnetic core 404 is accommodated at an open end of a can 408 lead wires 410 of the second inductive coil 402 extend through holes in the magnetic core 404 and connect to a first RF-ID Application Specific Integrated Circuit (ASIC) 412, that is located in the can 408 behind the magnetic core 404. The first RF-ID ASIC 412 is surrounded by a tamper resisting epoxy potting compound 414. The first RF-ID ASIC 412 preferably includes communication circuits coupled to the second inductive coil 402, a memory for storing information that is used to operate the first wireless device 302, as well as logic circuitry for reading out the memory and driving the communication circuits to transmit contents of the memory. The logic circuitry of the first RF-ID ASIC 412 preferably comprises a programmable microprocessor. Alternatively, the logic circuitry of the RF-ID ASIC 412 includes state logic.

Figure 5:
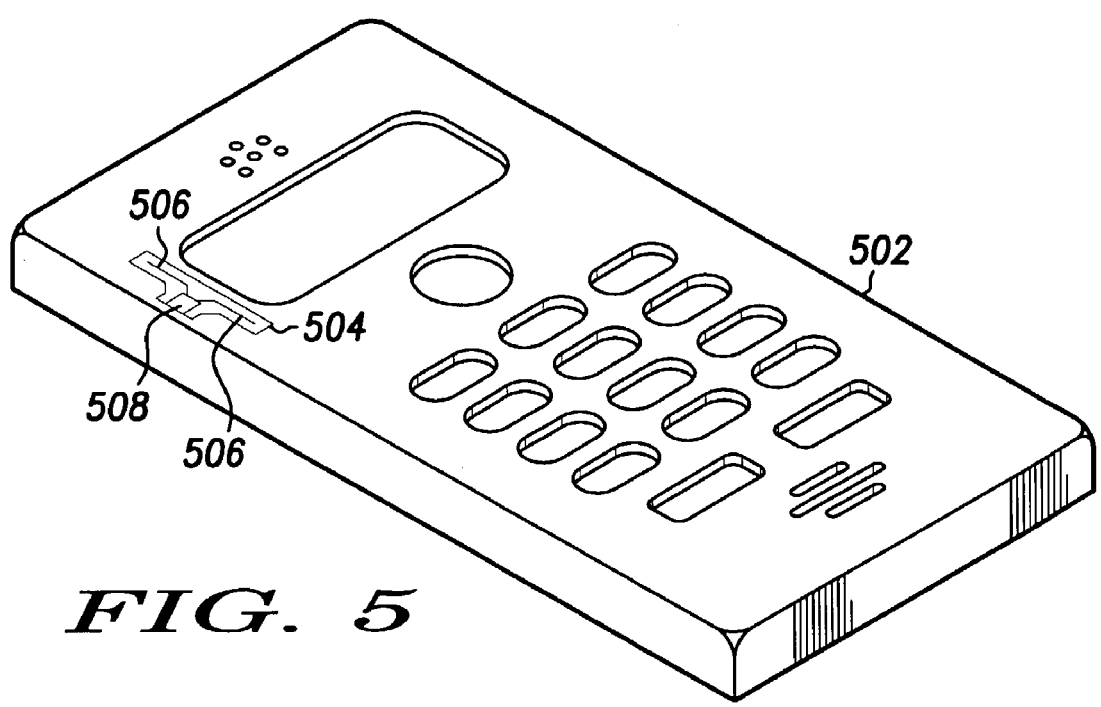
FIG. 5 is a partial x-ray perspective view of a second front fascia of a second wireless communication device.

FIG. 5 is a partial x-ray perspective view of a second front fascia 502 of a second wireless communication device (not shown) according to an alternative embodiment of the invention. The second front fascia 502 comprises a second RF-ID device 504 that differs from the first RF-ID device 114. Rather than including the second inductive coil 402, the second RF-ID device 504 preferably includes an air interface in the form of a center loaded dipole antenna 506. The dipole antenna 506 is coupled to a second RF-ID ASIC 508 that includes a load for the dipole antenna 506. In order to transmit data from the RF-ID ASIC, which preferably has no internal power source, the load on the dipole antenna 506 is modulated to encode information. The second RF-ID device 504 is embedded within the second front fascia 502. The second RF-ID device has the advantage that it can receive signals from a main antenna of the second wireless communication wireless device, thereby obviating the necessity for the first inductive coil 320 used in the first wireless communication device 302. Alternatively, a dedicated antenna is provided for exchanging signals with the loaded dipole antenna 506.

Figure 6:
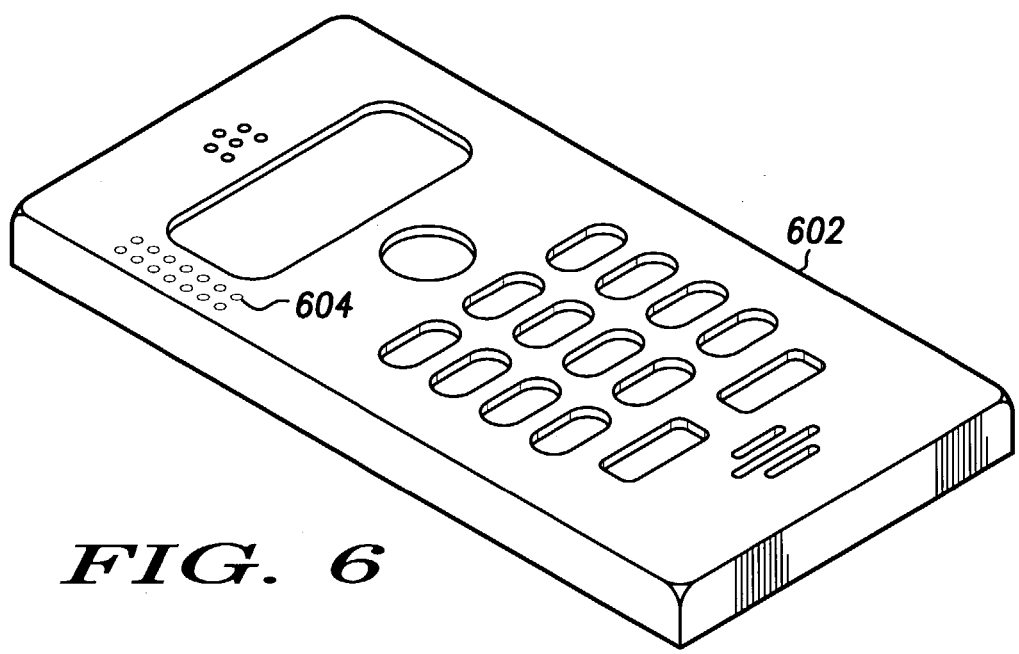
FIG. 6 is a partial x-ray perspective view of a third front fascia of a third wireless communication device.

FIG. 6 is a partial x-ray perspective view of a third front fascia 602 of a third wireless communication device 702 (FIG. 7) according to another alternative embodiment of the invention. A set of magnets 604 is embedded within the third front fascia 602. The magnetic poles of each of the set of magnets 604 is selected to encode information that is used to control the operation of the third wireless communication device 702. For example by having either a north or south pole of each magnet face a predetermined direction (e.g., inward with respect to the third wireless communication device 702) a binary digit can be encoded.

Figure 7:
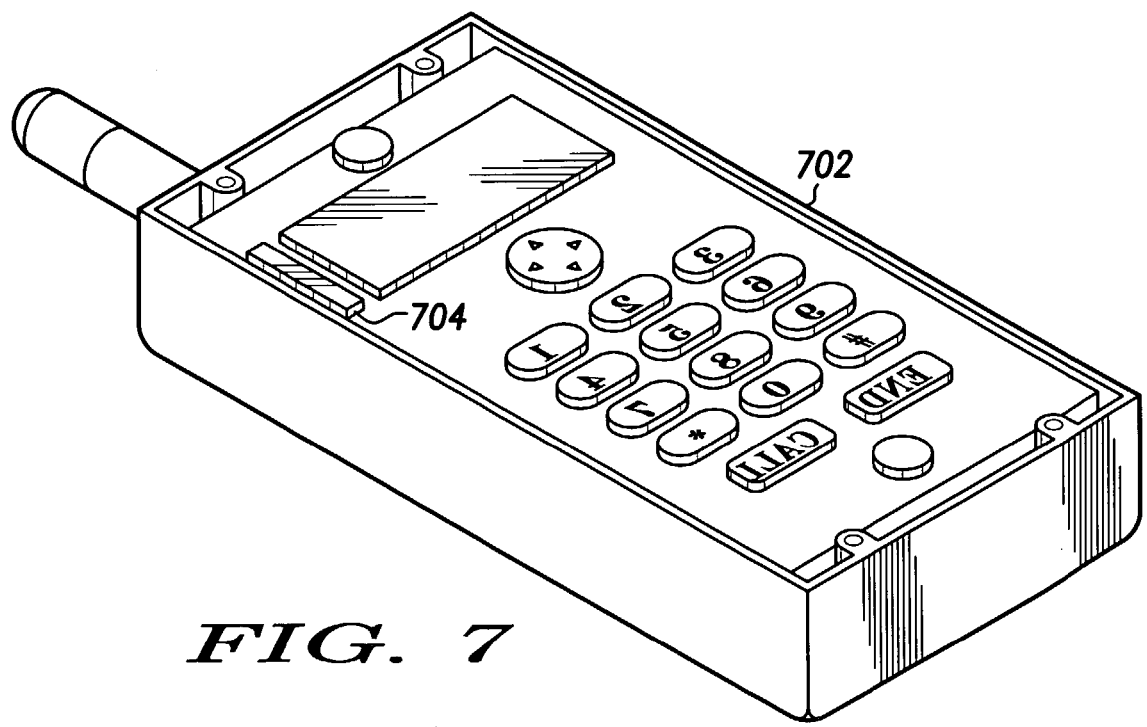
FIG. 7 is a perspective view of the third wireless communication device without the front fascia shown in FIG. 6.

FIG. 7 is a perspective view of the third wireless communication device 702 without the front fascia 602 shown in FIG. 6. The third wireless communication device 702 includes a set of magnetic field sensors, mounted together in a magnetic field sensor module 704. The magnetic field sensor module 704 is used to read the arrangement of the set of magnets 604, and make information encoded in the set of magnets available to a microprocessor (not shown in FIG. 7) that is coupled to the magnetic field sensor module 704. The magnetic field sensor module 704 preferably comprises one or more Hall effect sensors. The magnetic field sensor is a form of non contact reader for reading data encoded in the set of magnets 604.

Although as described above with reference to FIGS. 1, 2, 5, 6 a device or devices that stores configuration data is preferably located in a front fascia 102, 502, 602, alternatively a device or devices for storing configuration data are included in other detachable components of a wireless communication device such as a volume knob, a function key, frequency knob, or an escutcheon.

Figure 8:
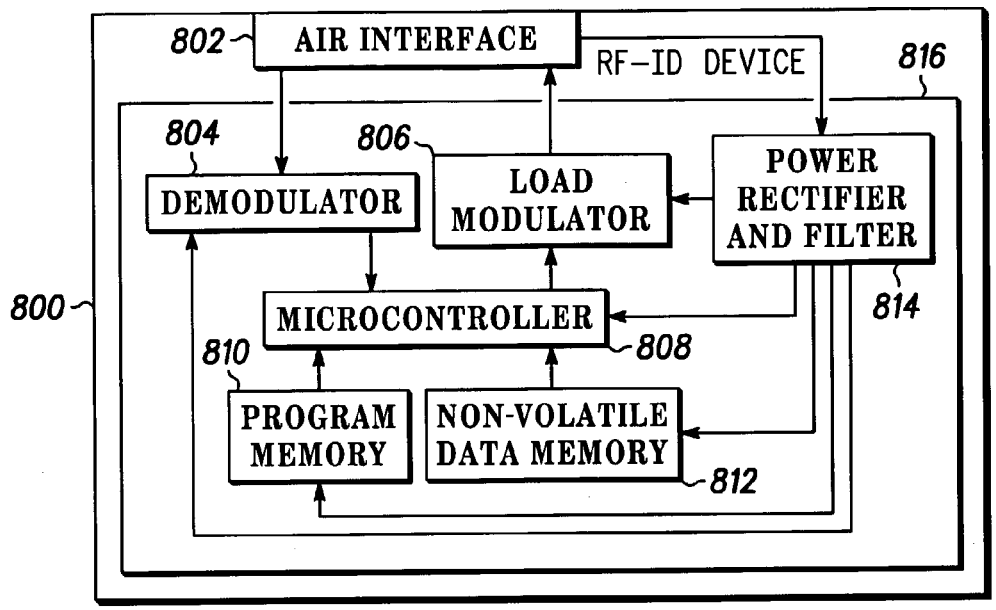
FIG. 8 is a block diagram of an RF-ID device.

FIG. 8 is a block diagram of an RF-ID device 800 according to the preferred embodiment of the invention. The internal architecture of the first RF-ID device 114, and the second RF-ID device 504 preferably corresponds to what is shown in FIG. 8. Referring to FIG. 8, the RF-ID device 800 comprises an air interface 802 which in the case of the first RF-ID device 114 takes the form of the second inductive coil 402, and in the case of the second RF-ID device 504 takes the form of dipole antenna 506. The air interface is coupled to a demodulator 804. The demodulator is used to process signals received from a wireless device from which the RF-ID device receives signals.

The air interface 802 is also coupled to a load modulator 806 that is used to modulate a load on the air interface 802. The load modulator 806 preferably comprises a field effect transistor (FET) configured as a variable resistor. In the case of the second inductive coil 402, the variable resistor is preferably connected in parallel with the inductive coil 402. In the case of the dipole antenna 506, such the variable resistor is preferably coupled between the two arms of the dipole antenna 506. The RF-ID device 800 is able to transmit information back to a wireless device with which the RF-ID device 800 is communicating by modulating the load on the air interface 802. A device with which the RF-ID device 808 is communicating receives information by that is encoded in detectable changes in load.

A microcontroller 808 is coupled to the demodulator 804, and to the load modulator 806. The microcontroller 808 reads data from the demodulator including messages received by the RF-ID device 800, and drives the load modulator 806 in order to send data. The microcontroller 808 is coupled to a program memory 810 that stores a program that is used to control the operation of the RF-ID device 800. The program memory 810 is a non volatile memory. The microcontroller 808 is also coupled to a second nonvolatile memory 812. The second nonvolatile memory 812 is used to store configuration data that is used by the operating program of an external device such as the above mentioned first 302, second and third 702 wireless communication devices to control the operation of the external device. Although the two memories 810, 812 are presented as separate in order to highlight there different purposes, in practice the two memories 810, 812 can be implemented as two address blocks within a single physical memory.

The air interface 802 is also coupled to a power rectifier and filter 814 that serves to extract power, for powering circuits of the RF-ID device from RF signals received through the air interface 802. The power rectifier and filter 814, for example, comprises a full wave bridge rectifier followed by a filter capacitor. The power rectifier and filter 814 is coupled to and supplies power to the demodulator 804, the load modulator 806, the microcontroller 808, and the memories 810, 812. The demodulator 804, the load modulator 806, the power rectifier and filter 814, the microcontroller 808, the program memory 810, and the non volatile data memory 812 are preferably implemented as a single ASIC 816, which in the case of the first RF-ID device 114 is embodied in the first RF-ID ASIC 412, and in the case of the second RF-ID device 504 is embodied in the second RF-ID ASIC 414. The RF-ID device 800 is a non-contact read out information bearing device.

In operation, in response to signals received from an external device, configuration data for the external device is read out of the non volatile memory 812 and sent to the external device via the load modulator 806. Optionally sending of the configuration data, is conditioned on successful authentication of the external device using cryptographic methods. Preferably, the configuration data sent is encrypted. The configuration data is alternatively encrypted as stored in the non volatile memory 812, or encrypted prior to sending.

Figure 9:
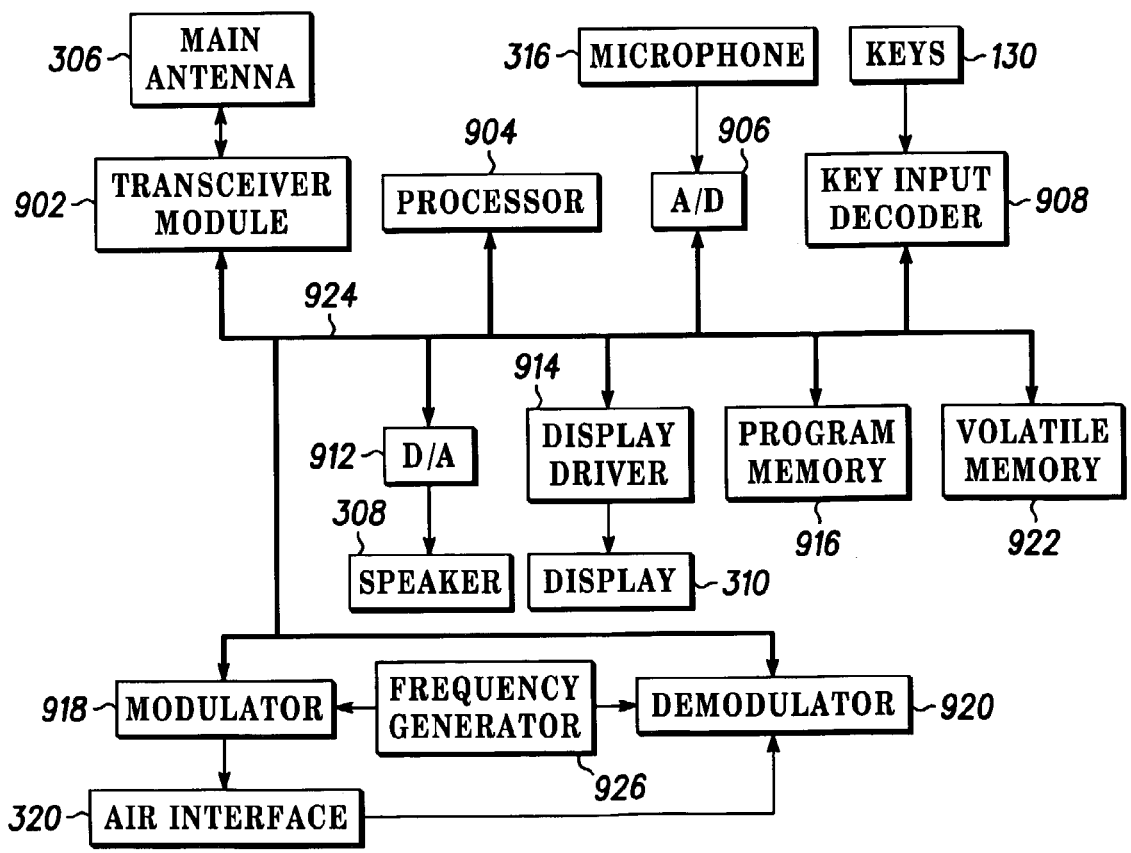
FIG. 9 is a block diagram of the first wireless communication device shown in FIG. 3.

FIG. 9 is a block diagram of the first wireless communication device 302 shown in FIG. 3 in accordance with a preferred embodiment of the invention. As shown in FIG. 9, the wireless communication device 302 comprises a transceiver module 902, a processor 904 (e.g., a digital signal processor), an analog to digital converter (A/D) 906, a key input decoder 908, a digital to analog converter (D/A) 912, a display driver 914, a program memory 916, a modulator 918, a demodulator 920, and a volatile memory 922 coupled together through a digital signal bus 924.

The transceiver module 902 is coupled to the antenna 306. Carrier signals that are modulated with data, e.g., audio data, pass between the antenna 306, and the transceiver 902.

The microphone 316 is coupled to the A/D 906. Audio, including spoken words, is input through the microphone 316 and converted to digital format by the A/D 906.

The keys 314 are coupled to the key input decoder 908. The key input decoder 908 serves to identify depressed keys, and provide information identifying each depressed key to the processor 904.

The D/A 912 is coupled to the speaker 308. The D/A 912 converts decoded digital audio to analog signals and drives the speaker 308. The display driver 914 is coupled to the display 310.

The modulator 918, and the demodulator 920 are coupled to a carrier frequency generator 926, and to the air interface in the form of the first inductive coil 320. The air interface 320 in combination with the demodulator 920 is a type of non-contact reader for reading information from the RF-ID device 800 (114). In operation, preferably upon powering up the first wireless communication device 302, signals are sent through the modulator 918 to the RF-ID device 800 (414) and optionally after carrying out an authentication handshake procedure, and optionally negotiating and encrypted communication link, configuration data for the first wireless communication device 302 is received through the demodulator 920 from the RF-ID device 800 (414). Thereafter the configuration data is preferably decrypted and stored in the volatile memory 922. In the latter case upon powering down the first wireless communication device, the configuration data will be erased and thus will not be accessible to persons seeking to pirate the configuration data. An encryption key used to decrypt the configuration data is preferably stored in the program memory 916. Alternatively, a user is prompted to enter the decryption key through the keys 314. The volatile memory 922, program memory 916 and the processor are preferably integrated in a single chip making it difficult to read the configuration data in decrypted form.

The program memory 916 is used to store programs that control the first wireless communication device 302. The programs stored in the program memory 916 are executed by the processor 904. The configuration data is used by the programs that control the wireless device 302. The configuration data can be used to control a variety of aspects of the operation of the wireless device. Examples of aspects of operation data that can be controlled by the configuration data include, frequency of operation, and enabling and disabling enhanced functionality such as, but not limited to, secure voice communication, web browsing, text messaging, and/or email. The configuration data preferably comprises binary encoded values, e.g., binary encoded frequencies, and binary flags e.g., flags that determine the outcome of decision statements in programs that control the operation of the first wireless communication device 302. The configuration data can for example includes what is termed in the art of wireless communication devices a 'code plug' for the wireless device 302.

According to an alternative embodiment of the invention when the front fascia 102 is mounted for the first time, configuration data is transferred from the first RF-ID device 114 to the wireless communication device 302 in response to keyed user input, and thereafter the configuration data is stored in a non volatile memory.

Figure 10:
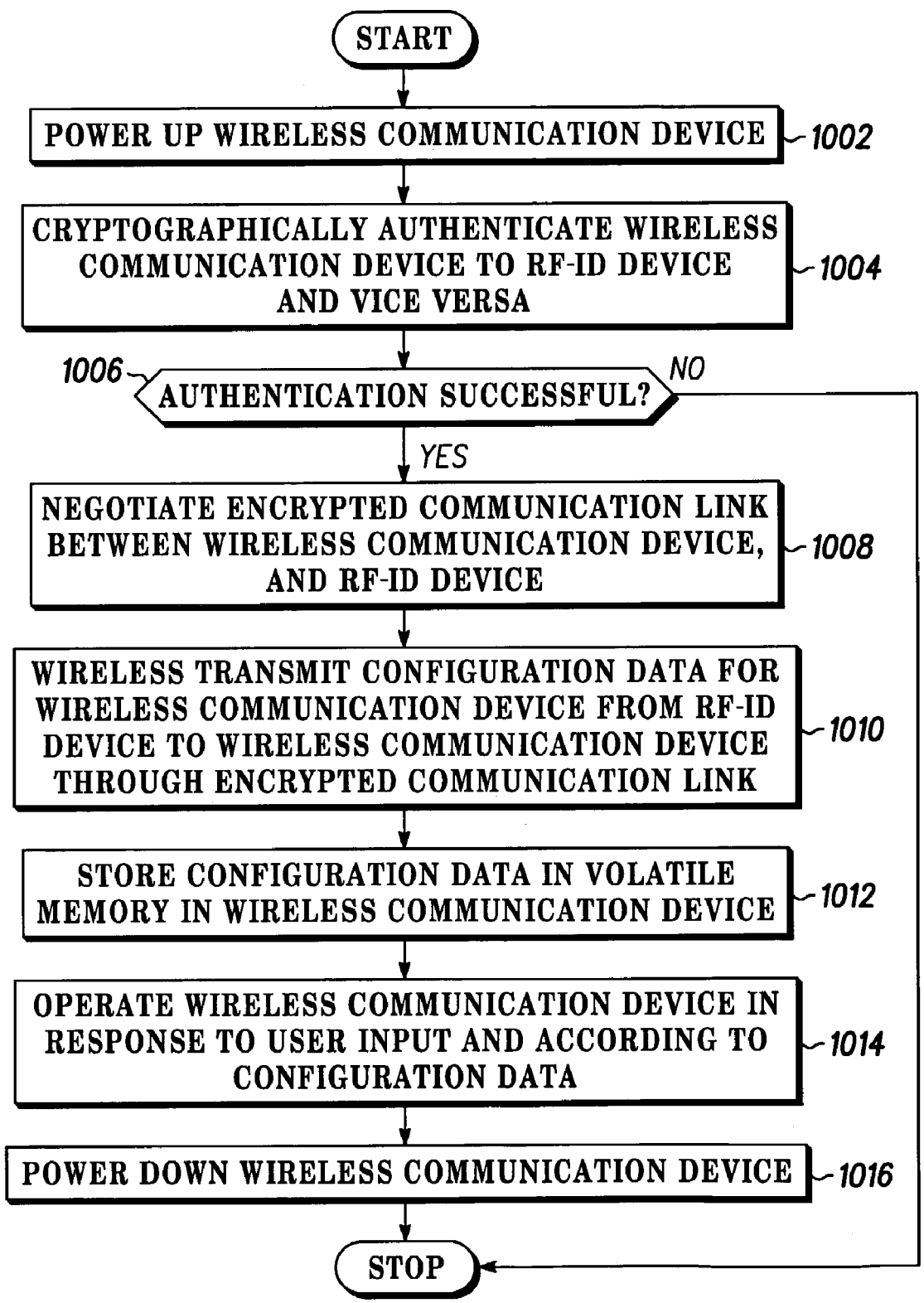
FIG. 10 is a flow chart of a method of operating an RF-ID device, in conjunction with a wireless communication device.

FIG. 10 is a flow chart of a method of operating the first RF-ID device 114, in conjunction with the first wireless communication device 302 according to the preferred embodiment of the invention. In step 1002 the first wireless communication device 302 is powered up. In optional block 1004, cryptographic procedures are used to authenticate the first wireless communication device 302 to the RF-ID device 114, and to authenticate the RF-ID device 114 to the first wireless communication device 302. Block 1006 is a decision block the outcome of which depends on whether the authentication performed in step 1006 was successful. If not then the process terminates. If on the other hand authentication was successful the process continues with block 1008 in which an encrypted communication link is set up between the first wireless communication device 302, and the first RF-ID device 114. Known authentication and encryption methods can be used in performing the blocks 1004, 1008. In block 1010 the configuration data is wirelessly transmitted from first RF-ID device 114 the first wireless communication device 320. In block 1011 the configuration data is stored in the volatile memory 922 of the first wireless communication device 320. In block 1014 the first wireless communication device 320 is operated in response to user input and in accordance with the configuration data. In block 1016 the first wireless communication device 320 is powered down. When the first wireless communication device 320 is powered down the configuration data is lost from the volatile memory 922 and thus not available for unauthorized reading from the first wireless communication device 320.

Storing configuration data for a wireless communication device in an RF-ID device makes the data more secure, and makes it more difficult for configuration data to be altered in order to make a wireless communication device perform functions that it was not intended to perform when it was initially sold. Storing configuration data in an RF-ID device, or otherwise (e.g., by magnets) encoded, in a detachable part (e.g., front fascia 102, 502, or 602) also allows phones to be upgraded in terms of functionality by replacing the detachable part.

Figure 11:
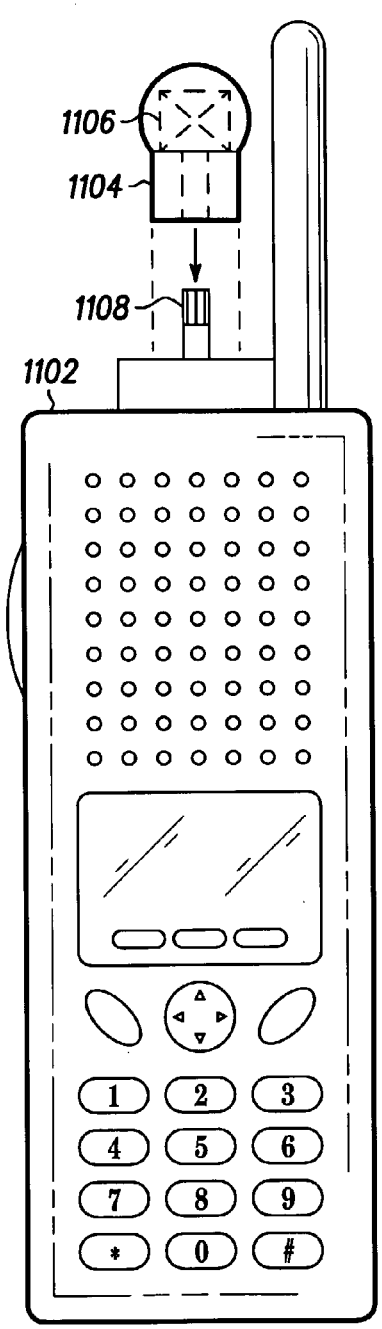
FIG. 11 is a front view of a fourth wireless communication device.

FIG. 11 is a front view of a fourth wireless communication device 1102 according to yet another embodiment of the invention. The fourth wireless communication device 1102 differs from the first wireless communication device 302, in that the fourth wireless communication device 1102 includes a removable control knob 1104, that includes a third RF-ID device 1106, as opposed to the removable front fascia 102 including first RF-ID device 114 of the first wireless communication device 302. The removable control knob 1104 with third RF-ID device 1106 is preferably manufactured by insert molding. The removable knob 1104 fits onto a shaft 1108 of the fourth wireless communication device 1102. The shaft 1108 is preferably part of a rotary switch or a rotary continuously variable impedance adjustment device such as a potentiometer used to control volume. The knob 1104 including the third RF-ID device 1106 can be easily removed, carried and put on a wireless communication device in order to enable such wireless communication device to operate in accordance with configuration date stored in the third RF-ID device.

Figure 12:
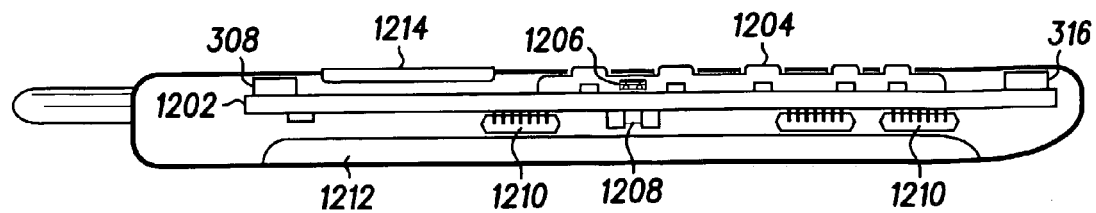
FIG. 12 is a cross sectional side view of a fifth wireless communication device.

FIG. 12 is a cross sectional side view of a fifth wireless communication device 1200 according to a further embodiment of the invention. The fifth wireless communication device 1200 includes an internal circuit board 1202 that supports and electrically interconnects a number of components including an elastomeric keypad 1204. A fourth RF-ID device 1206 is molded within the elastomeric keypad 1204. The circuit board 1202 also supports a third solenoid 1208 that is used to exchange data with the fourth RF-ID device 1206, and other circuit components 1210 that embody the electrical circuits described above with reference to FIG. 9. A battery 1212 is also provided.

Including the fourth RF-ID device 1206 in the keypad 1204 facilitates differentiating otherwise identical devices, substituting different keypads 1204 that have different text, and icons on keys of the keypad 1204, and changing in a complementary way configuration data that controls the function of the keys, and optionally other configuration data such as the content of menus displayed on a display 1214. The function of individual function keys included in the keypad 1204 is preferably determined by configuration data stored in the RF-ID device 1206, and indicated by text or icons printed on each function key. Thus by changing the keypad 1204 wireless communication devices can be differentiated to suit different user groups, e.g., teenagers interested in gaming vs. professionals more interested in organizing contact information, or Spanish speakers vs. English speakers.

According to an alternative embodiment of the invention, a detachable part of a wireless communication device includes an RF-ID device that includes a read/write memory, and the wireless communication device itself is programmed to transmit configuration data that includes user data to the RF-ID device, and also to receive the configuration data from the RF-ID device, and the RF-ID device is programmed to store the user preferences received from the wireless communication device for future use, and thereafter transmit the user data to the wireless communication device. Such an embodiment allows the detachable device that stores the user's data to be moved from one wireless communication device to another. The user data can for example comprise volume settings, default channels, screen layout, display contrast, font size, date and time format, soft button definitions and/or personal phone book listings. This embodiment is particularly useful in situations where the user can be assigned one of many wireless communication devices from a pool of devices available to the user's organization, or in the case that a user rents or is loaned a wireless communication device. In such instances, simply by attaching the detachable device including the RF-ID device, including previously stored user data a wireless communication device that is new to the user can be readily configured according to the user's data by transferring that data in the form of configuration data from the RF-ID device to the wireless communication device.

Figure 13:
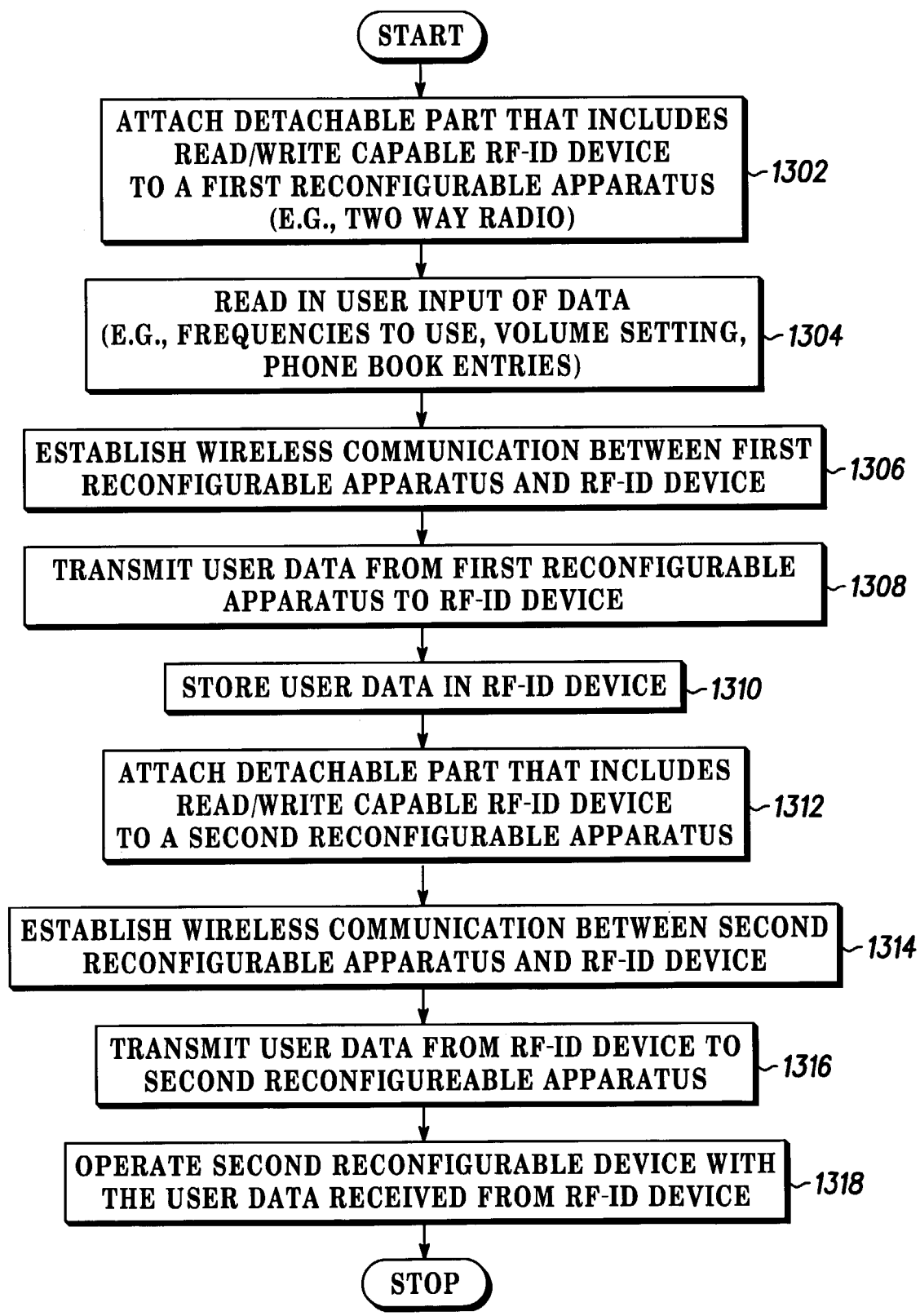
FIG. 13 is a flow chart of a method of operating a READ/WRITE capable RF-ID in conjunction with two separate reconfigurable apparatuses.

FIG. 13 is a flow chart of a method of operating a read/write capable RF-ID in conjunction with two separate reconfigurable apparatuses (e.g., two way radios, cellular telephones). In step 1302 a detachable part (e.g., front fascia 102, 502, 602, knob 1104, keypad 1206) that includes a read/write capable RF-ID device is attached to a first reconfigurable apparatus. Attaching the detachable part serves to insure that the RF-ID device included in the detachable part is positioned such that good signal strength can be achieved in exchanging data signals between the reconfigurable apparatus and the RF-ID device using without the need for high power signals. In step 1304, user input of data (e.g. frequencies to use, volume settings, phone book entries) is read in. To perform step 1304, the first reconfigurable apparatus is programmed to accept user input, e.g., through keys 314. The first reconfigurable apparatus is preferably programmed to present one or more menus, e.g., on the display 310, that guide the user in entering input.

In step 1306 wireless communication is established between the RF-ID device and the first reconfigurable apparatus, and in step 1308 the user data previously entered by the user and accepted in step 1304, is transmitted from the first reconfigurable apparatus to the RF-ID device. In step 1310 the user data is stored in a nonvolatile memory in the RF-ID device. The first reconfigurable apparatus is preferably programmed to transfer any changes to configuration data made by a user to the RF-ID device in the detachable part.

In step 1312 the detachable part including the read/write capable RF-ID device is attached to a second reconfigurable apparatus, and in step 1314 wireless communication is established between the second reconfigurable apparatus and the read/write capable RF-ID device. In step 1316 user data that was stored in the RF-ID device in step 1310 is transmitted from the RF-ID device, and received by the second reconfigurable apparatus. In step 1318 the second reconfigurable apparatus is operated with the user data received from the RF-ID device. For example, the second reconfigurable apparatus will be configured according to volume and frequency settings received from the RF-ID device, and phone book entries stored on the RF-ID device will be available on the second reconfigurable apparatus.

Although the invention as described above with reference to several specific embodiments is particularly applicable to wireless communication devices, such as cellular telephones, and two way radios, it should be noted that the invention can be applied to other types of electronic devices, such as for example video game consoles, set top boxes, digital cameras etc.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. An electronic apparatus comprising:
   one or more memories;
   a program for operating the electronic apparatus stored in at least one of the one or more memories;
   a processor for executing the program coupled to the one or more memories;
   a non-contact information reader coupled to at least one of the one or more memories;
   a non-contact readout information bearing proximity device, which only coupled to the non-contact information reader when in its proximity, the information bearing device storing one or more items of information that are used by the program for operating the electronic apparatus.

2. The electronic apparatus according to claim 1 wherein the electronic apparatus further comprises:
   a detachable part; and
   the non-contact readout information bearing device is included in the detachable part of the electronic apparatus.

3. The electronic apparatus according to claim 1 wherein:
   the information bearing device comprises an arrangement of magnets that encodes the one or more items of information.

4. The electronic apparatus according to claim 1 comprising:
   a wireless communication device.

5. The electronic apparatus according to claim 4 comprising:
   a two-way radio.

6. The electronic apparatus according to claim 4 comprising:
   a cellular telephone.

7. The electronic apparatus according to claim 1 wherein:
   the information bearing device comprises an RF-ID device.

8. The electronic apparatus according to claim 7 wherein:
   the RF-ID includes the one or more items of information stored in encrypted form.

9. The electronic apparatus according to claim 7 wherein:
   the one or more memories comprise a volatile memory for storing the one or more items of information.

10. The electronic apparatus according to claim 9 wherein:
    the RF-ID device comprises a non-volatile memory for storing the one or more items of information.

11. The electronic apparatus according to claim 7 wherein:
    the electronic apparatus comprises a main antenna; and
    the RF-ID device comprises a second antenna for exchanging signals with the main antenna.

12. An electronic apparatus comprising:
    one or more memories;
    a program for operating the electronic apparatus stored in at least one of the one or more memories;
    a processor for executing the program coupled to the one or more memories;
    a non-contact information reader coupled to at least one of the one or more memories;
    a non-contact readout information bearing proximity device, which is only coupled to the non-contact information reader when in its proximity, the information bearing device storing one or more items of information that are used by the program for operating the electronic apparatus; and
    a front fascia, wherein the information bearing device is embedded in the front fascia.

13. An electronic apparatus comprising:
    one or more memories;
    a program for operating the electronic apparatus stored in at least one of the one or more memories;
    a processor for executing the program coupled to the one or more memories;
    a non-contact information reader coupled to at least one of the one or more memories;
    a non-contact readout information bearing proximity device, which is only coupled to the non-contact information reader when in its proximity, the information bearing device storing one or more items of information that are used by the program for operating the electronic apparatus; and
    a control knob, wherein the information bearing device is embedded in the control knob.

14. An electronic apparatus comprising:
    one or more memories;
    a program for operating the electronic apparatus stored in at least one of the one or more memories;
    a processor for executing the program coupled to the one or more memories;
    a non-contact information reader coupled to at least one of the one or more memories;
    a non-contact readout information bearing proximity device, which is only coupled to the non-contact information reader when in its proximity, the information bearing device storing one or more items of information that are used by the program for operating the electronic apparatus; and
    a keypad, wherein the information bearing device is embedded in the keypad.

15. An electronic apparatus comprising:
    a processor for executing a program for operating the electronic apparatus;
    a first volatile memory coupled to the processor for storing one or more items of configuration data on which execution of the program is dependent;
    a mechanically attachable device comprising a second non-volatile memory for storing the one or more items of configuration data, the mechanically attachable device being capable of communicatively coupling with the first volatile memory through at least one or more circuits in order to transfer the one or more items of configuration data to the first volatile memory.

16. The electronic apparatus according to claim 15 wherein:
    the electronic apparatus comprises a wireless communication device.

17. The electronic apparatus according to claim 15 wherein:

the mechanically attachable device is capable of communicatively coupling with the first volatile memory, through a signal pathway that includes an air interface in addition to the one or more circuits.

18. A method of operating a mechanically attachable configuration data bearing device in conjunction with an electronic apparatus the operation of which is dependent on the configuration data, the method comprising the steps of:

cryptographically protecting one or more items of configuration data; and wirelessly transmitting the one or more items of configuration data from the detachable configuration data bearing device to the electronic apparatus.

19. The method according to claim 18 wherein the step of cryptographically protecting the one or more items of configuration data comprises:

authenticating the electronic apparatus to the detachable configuration data bearing device, and conditioning the step of transmitting on successful authentication.

20. The method according to claim 18 wherein the step of cryptographically protecting the one or more items of configuration data comprises:

encrypting the one or more items of configuration data.

21. The method according to claim 20 wherein:

encrypting the one or more items of configuration data is performed prior to storing the one or more items of configuration data in the detachable configuration data bearing device.

22. A method of operating an attachable device that is capable of storing configuration data in conjunction with a plurality of reconfigurable apparatuses the operation of which are dependent on the configuration data, the method comprising the steps of:

connecting the mechanically attachable device that is capable of holding configuration data to a first reconfigurable apparatus;

accepting user input of configuration data input into the first reconfigurable apparatus;

establishing wireless communication between the first reconfigurable apparatus and the detachable device;

transmitting configuration data from the first reconfigurable apparatus to the detachable device;

storing the configuration data in the detachable device;

attaching the detachable device to a second reconfigurable apparatus;

establishing wireless communication between the detachable device and the second reconfigurable apparatus;

transmitting the configuration data from the detachable device to the second reconfigurable apparatus; and operating the second reconfigurable apparatus according to the configuration data received from the detachable device.

* * * * *